United States Patent [19]
Sullivan et al.

[11] 3,834,623
[45] Sept. 10, 1974

[54] SPRAYING SUBSTANCES
[75] Inventors: John Terence Sullivan; Robert George Littlefair, both of Stockton-on-Tees, England
[73] Assignee: Imperial Chemical Industries Limited, London, England
[22] Filed: July 27, 1973
[21] Appl. No.: 383,294

[30] Foreign Application Priority Data
Aug. 2, 1972  Great Britain.................... 36013/72

[52] U.S. Cl............................. 239/139, 239/417.5
[51] Int. Cl................................................ B05b 1/24
[58] Field of Search ............ 239/131, 135, 139, 79, 239/417.5; 222/146 H

[56]  References Cited
UNITED STATES PATENTS
1,642,418   9/1927   Kovanda et al................. 239/139 X
2,395,483   2/1946   James ............................. 239/139 X
3,383,049   5/1968   Guerin........................ 239/417.5 X Primary Examiner—M. Henson Wood, Jr.
Assistant Examiner—Gene A. Church
Attorney, Agent, or Firm—Cushman, Darby & Cushman

[57]  ABSTRACT

Apparatus for spraying substances which are solid at ambient temperatures, using an atomising nozzle having an inlet for compressed air, an inlet for liquid, and an outlet for spraying mixed air and liquid, comprises a steam-jacketed pipe for compressed air connected to the air inlet and a steam-jacketed pipe for the substance connected to and through the liquid inlet so as to deliver the molten substance substantially up to the spray outlet.

7 Claims, 4 Drawing Figures

SPRAYING SUBSTANCES

The invention relates to spraying apparatus having at least one nozzle which uses a compressed gas, such as air, as anatomising medium for spraying substances which are normally solid at ambient temperatures. The invention is particularly, but not exclusively, intended for spraying sulphur, for example onto particulate material, such as urea or other fertilizes, in order to provide a coating of sulphur thereon. Sulphur-coated urea is now recognised as a valuable slow-release fertilizer.

However, the spraying of sulphur onto urea presents certain difficulties; if the sulphur is used as a finely divided powder it does not adhere to the urea satisfactorily, and if it is used in the molten state is invariably clogs the spraying means, and the object of the present invention is to overcome these difficulties. The invention is primarily intended for use with a substantially horizontally-disposed open-ended rotating drum with an inlet and outlet for particulate urea (e.g., crystalline or prilled urea) and in which the particulate urea is constantly tumbled; the sulphur-spraying apparatus of the invention is likewise substantially horizontally disposed protruding into the rotating drum through one end thereof with at least one sulphur-spraying nozzle located in the drum substantially along the horizontal centre-line thereof. It is to be understood, however, that the invention is not limited to the coating of urea with sulphur, that the drum and sulphur-spraying apparatus are not necessarily horizontally disposed, and that a vessel other than a rotating drum may be used.

The spraying-nozzle to be used in the present invention may be any conventional nozzle of the kind to which there is connected at least one line for supplying a compressed gas, such as air, as the atomising medium, and at least one line for supplying the substance to be sprayed (e.g., sulphur). We have now found that if both the compressed air line and the sulphur line are steam-jacketed so that the sulphur is always maintained at a temperature of at least 115°C, and preferably at about 140°C to 150°C (which is well above its melting point), not only is clogging of the spray nozzle and sulphur line completely eliminated, but the sprayed molten sulphur provides an even and fully satisfactory coating on the urea particles.

The present invention accordingly provides an apparatus for spraying substances which are normally solid at ambient temperatures, comprising in combination a steam-jacketed line for a compressed gas, a steam-jacketed line for the substance to be sprayed, the said line being maintained at a temperature above the melting point of the substance, an atomising nozzle located between the two steam-jacketed lines, the said nozzle being of the kind adapted to use gas as an atomising medium for molten substances, a pipe connecting the compressed gas line to a gas inlet of the nozzle and a pipe connecting the line for the molten substance through a liquid inlet of the nozzle and into the interior thereof. In a preferred embodiment, the gas is air and the substance to be sprayed is sulphur.

For economic reasons, the two steam jackets are preferably connected to one another, at or near their far ends, by a steam connection, so that steam is admitted near the beginning of the air line and steam condensate is removed near the beginning of the line for the substance to be sprayed, or vice versa.

One embodiment of the invention is hereinafter described with reference to the accompanying drawings, wherein.

Figure 1:
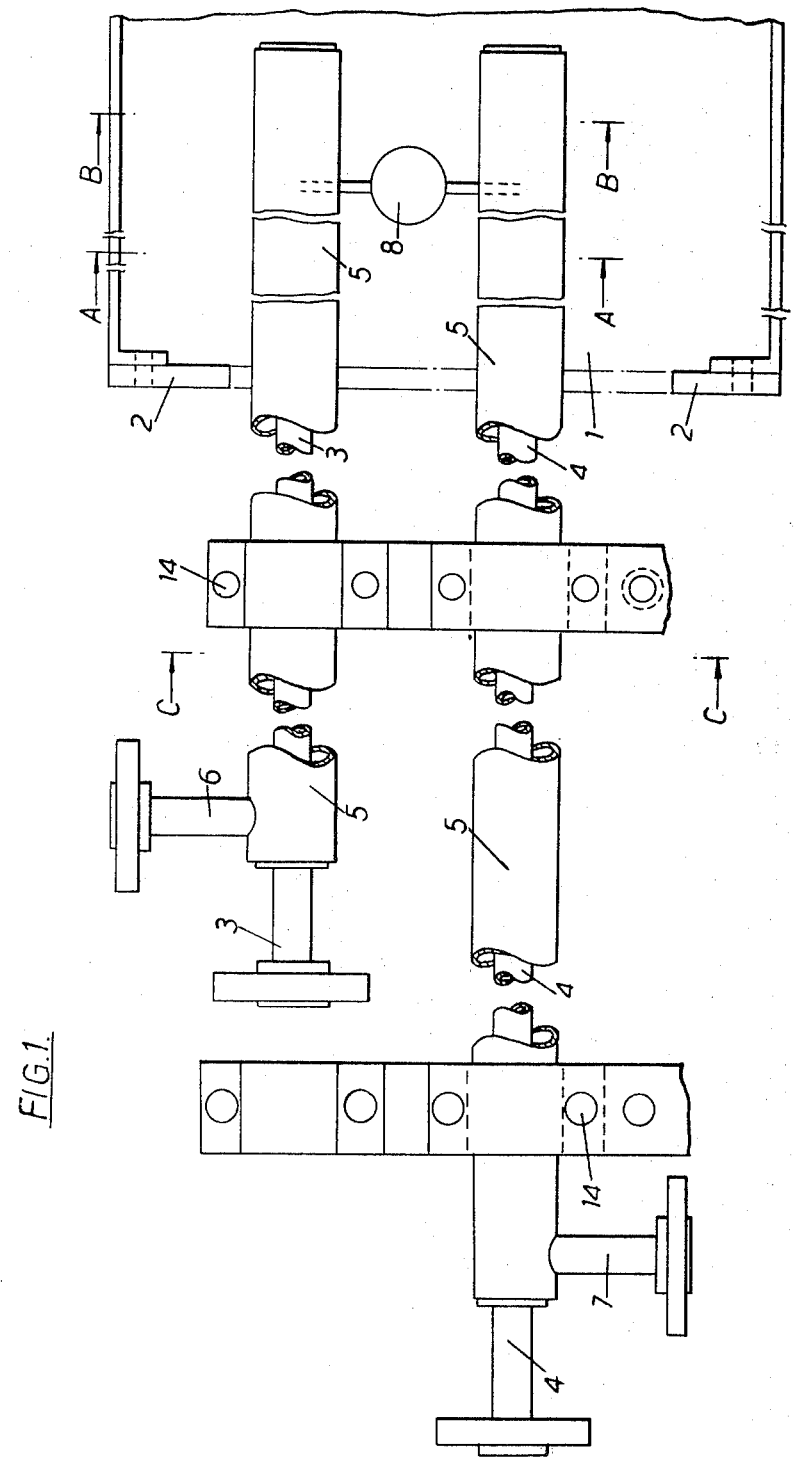
FIG. 1 is a diagrammatic view of one embodiment of the apparatus according to the invention for spraying molten sulphur onto particulate urea in a a rotating drum.

Referring to the drawings, 1 represents an open-ended rotatable drum with end-lips 2, in which a bed of particulate urea is continuously tumbled in known manner. Protruding into the drum are a line 3 for compressed air or other gas as an atomising medium and a line 4 for molten sulphur or other substance to be sprayed. Both the air line 3 and the sulphur line 4 are covered by lagged steamjacketing 5, steam being introduced at 6 and condensate being removed at 7. The temperature and pressure of the steam should be such that the condensate is sufficiently hot to maintain the sulphur at the point 7 in a molten condition, that is to say at a temperature of at least 115°C and preferably at 140°C to 150°C.

Figure 2:
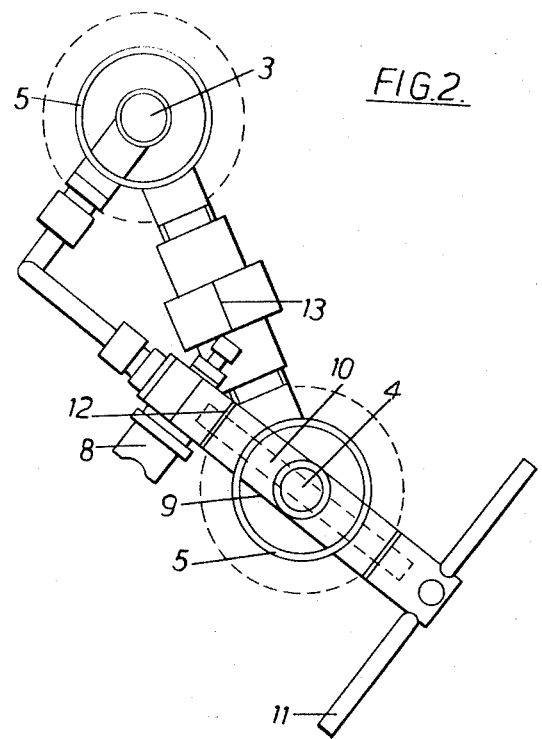
FIG. 2 is a section along the line A—A of FIG. 1, showing the atomising nozzle arrangement.

As illustrated schematically, at one or more points within the drum, the air line 3 and the sulphur line 4 are connected (through apertures provided in the steam-jacketing 5) to an improved atomising nozzle 8 (see FIG. 2) which sprays an atomised mist of air and sulphur onto the particulate urea tumbling in the rotating drum 1. The atomising nozzle arrangement within the drum 1 is illustrated in detail in FIG. 2. The air line 3 is connected to the air inlet of the nozzle 8 by conventional jointing and coupling means. The sulphur line 4, on the other hand, is connected to the liquid inlet of the nozzle 8 by a hollow pipe 9 enclosing and connecting with a hollow, apertured spindle 10; the delivery end of the spindle 10 is actually located within the interior of the nozzle 8 (for example by screwing it in by a handle 11) to ensure that the molten sulphur is delivered as far into the incoming compressed air as possible. This also helps to maintain a high temperature within the nozzle, and in order to ensure a minimum temperature drop between the pipe 9 and the nozzle, they are preferably connected by a metal washer 12 of good heat conductivity, e.g., lead.

Figure 3:
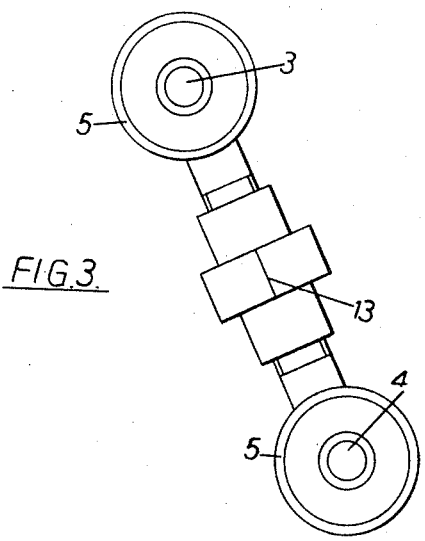
FIG. 3 is a section along the line B—B of FIG.1, showing the steam connection between the air line and the sulphur line.

At a point beyond the spraying nozzle 8 in the drum 1, the steam-jacketing for the air line 3 is connected to the steam-jacketing for the sulphur line 4 by a steam connection 13 which is shown in detail in FIG. 3 and comprises a socket union secured by branch welds to the two steam jackets 5.

Figure 4:
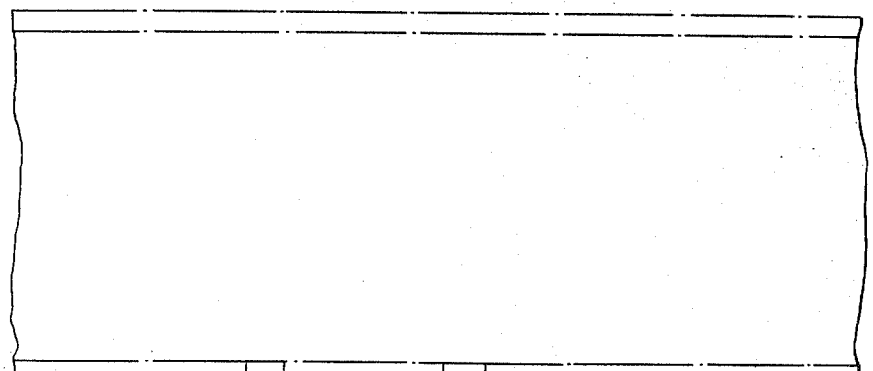
FIG. 4 is a section along the line C—C of FIG. 1, illustrating how the air line and sulphur line may be supported.

The steam-jacketed air line and sulphur line are supported at one or more points along their length by suitable pipe support brackets 14; suitable pipe supports are illustrated in FIG. 4.

We claim:

1. An apparatus for spraying substances which are normally solid at ambient temperatures, comprising in combination a steam-jacketed line for a compressed gas, a steam-jacketed line for the substance to be sprayed, the said line being maintained at a temperature above the melting point of the substance, an atomising nozzle located between the two steam-jacketed lines, the said nozzle being of the kind adapted to use compressed gas as an atomising medium for molten substances, an inlet to the nozzle for compressed gas, an inlet to the nozzle for liquid, and a spray outlet for the atomised mixture of gas and liquid, means for connecting the line for the molten substance through the liquid inlet and the interior of the nozzle substantially up to spray outlet, the line for the substance to be sprayed being connected to the liquid inlet of the nozzle by a hollow pipe enclosing and connecting with a hollow apertured spindle having a delivery end which is located substantially within the spray outlet of the nozzle.

2. An apparatus as claimed in claim 1, wherein the two steam jackets are connected to one another at the end thereof nearest to the nozzle, by a steam connection, so that steam is admitted near the beginnning of the air line and steam condensate is removed near the beginning of the line for the substance to be sprayed.

3. An apparatus as claimed in claim 1, wherein the line for compressed gas and the line for the substance to be sprayed are connected to the gas inlet and the liquid inlet respectively of the nozzle by means of pipes passing through apertures provided in the steam jacketing.

4. An apparatus as claimed in claim 1, wherein the line for compressed gas is connected to the gas inlet of the nozzle by conventional jointing and coupling means.

5. An apparatus as claimed in claim 1, wherein the said hollow pipe is connected to the liquid inlet of the nozzle by a metal washer of good heat conductivity.

6. An apparatus as claimed in claim 1, wherein the spindle is adapted to be moved backwards and forwards within the hollow pipe, out of and into the spray outlet, so that the molten substance to be sprayed can be moved into the compressed gas entering the nozzle to any desired extent.

7. An apparatus as claimed in claim 6, wherein the spindle is adapted to be moved by a screw handle.

* * * * *